April 21, 1970     N. O. BRYSON     3,507,071

HOLDER FOR FISHERMAN'S FLIES

Filed Aug. 8, 1968

NEWTON O. BRYSON
INVENTOR.

BY *Roy H. Smith, Jr.*
ATTORNEY

United States Patent Office 3,507,071
Patented Apr. 21, 1970

3,507,071
HOLDER FOR FISHERMAN'S FLIES
Newton O. Bryson, 1801 Huldy St., Apt. 7,
Houston, Tex. 77019
Filed Aug. 8, 1968, Ser. No. 751,298
Int. Cl. A01k 97/06
U.S. Cl. 43—57.5     6 Claims

ABSTRACT OF THE DISCLOSURE

A holder having a sheetlike base and a multiplicity of elongated projecting legs integrally secured to the base, the entire holder preferably being formed as a plastic extrusion. In a type adapted to hold flies and other objects which must have a portion protruding for ready withdrawal, the legs are closely spaced and have lateral protrusions or knobs which grip, e.g., the hook of a fly and prevent it from moving in any direction. In a type adapted for use as a shipping container the legs are shaped to receive the objects, sometimes with knobs and sometimes with grooves in the legs, and spacers may be added between legs to separate objects of short length. The legs may have simple straight sides for specially shaped objects.

---

Figure 1:
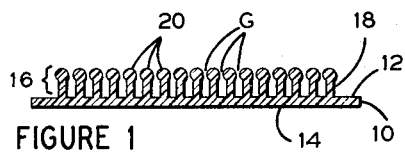

The present invention lies in the field of small object holders, for instance to hold artifical flies used in fishing for trout and other fish, and can be utilized for holding a wide variety of items such as paper clips, nails, screws and the like. By suitable size adjustment embodiments of the invention may be used on the dashboard of an automobile to hold miscellaneous materials such as pencils, pens, sunglasses, coins, cosmetics, keys, mirror, etc. Modified forms may also be used as shipping containers for small objects of a delicate construction.

The undersigned inventor is a fly fisherman, and was long exasperated by the lack of suitable means to carry a wide assortment of flies while actually fishing. What was desired was some sort of holding means that could be easily carried on the person or fit one's existing equipment. Such holding means should be readily accessible, should hold the files separated from one another so that the one selected can be easily removed from the holder, should hold the flies so that all of them are visible, should keep the flies from becoming tangled and/or damaged, and should not involve the risk that some of the flies will be dropped or carried off by a vagrant wind.

The best commercially available fly holder falls considerably short of filling all these standards, as it is little more than a flat box provided with a grid of spacing ribs forming a number of small compartments, one for each fly. It is typically made of a rather brittle plastic material, and is generally provided with a transparent hinged cover and a latch to keep the cover closed. While such a holder keeps the flies separated, the box must be carried in a pocket or creel, and the flies only become visible when the box is withdrawn from its carrying place. The next step, that of withdrawing the fly selected, involves the further difficulty that the box must be held in one hand while the cover is opened and a fly withdrawn with the other hand. Once having withdrawn the fly, the fisherman must do something with it before he can close the box and return it to his pocket. Since all the while he may be standing hip deep in a running stream of icy water and juggling his rod and other various items of fishing gear, and in addition the stream bottom on which his feet are resting may be somewhat slippery and treacherous, it can be appreciated that there is a good possibility that some accident may (and sometimes does) befall his box of flies before he can stow it safely away. The entire box may be dropped and quickly sink or float out of reach, or a wind may lift some or all of the flies out of the box and carry them in all directions.

Such a box is also bulky, and is limited in capacity because each compartment must be large enough to hold a fly without damaging it. If more than one fly is used in a compartment, they may become tangled and damaged. Also, such boxes as are reasonable in price are also quite brittle, and if trod upon are almost certain to be crushed. While this involves little economic loss, it leaves the fisherman out in the field with no fly holder.

The compartmentalized box probably offers little more than an older expedient used by many fly fishermen, an old felt hat. While the hat is somewhat more available, it too requires the use of both hands and the risk that the hat may be dropped or blown away, even off the fisherman's head. In addition, a fly will sometimes become so entangled in the hat that it cannot be backed out, and the only way to extricate it is by cutting away a piece of the hat—another two-handed operation.

The hat method also compels a fisherman who prefers to go hatless to wear a headpiece which he may find uncomfortable and distasteful. Both techniques involve limited capacity, and once the fisherman starts out with a given box or hat he cannot increase the capacity of his holder—unless he crowds his flies together and thus risks getting them both tangled and damaged.

It is the main object of the present invention to furnish a holder for flies and other small objects which overcomes the above named disadvantages of prior known expedients. A second object is to provide a fly holder which may be manufactured at a reasonable cost and sold at a reasonable price, and yet is sturdy and rugged, not easily damaged in service nor affected by fishing gear lubricants and prolonged exposure to sunlight. A third object is to furnish such a fly holder which can be readily adjusted and/or adapted to the desired size by any fisherman, using ordinary tools such as a pocket knife or a pair of scissors.

A fourth object is to furnish a fly holder which may be worn on the person to accommodate a large number of flies which are all readily visible, and from which a selected fly may be withdrawn by the use of only one hand, leaving the other hand free to hold a rod or whatever is necessary or desirable. A fifth object is to furnish two or more such fly holders which may be used side-by-side or end-to-end to increase the total number of flies the fisherman can carry with him. A sixth object is to furnish such a fly holder which is securely fixed to the fisherman's clothing or gear in such manner that it is virtually impossible to separate it therefrom, thus minimizing the possibility of loss.

A seventh object is to provide a fly holder which accommodates a wide assortment of flies so that a part of each fly is exposed to the sight and touch of the fisherman and yet each fly is securely restrained in the holder against dropping or other accidental separation and is readily removable and readily replaceable in the holder.

With respect to small items other than flies, it is an object of the present invention to supply one type of small object holder which retains small objects therein so that they are at least partially visible and are readily available for removal with one hand. A further object is to make such holder so that the small objects will be held by frictional contact to avoid sliding of the objects and avoid having them rattle against one another. Another object is to provide such a holder for small objects of various sizes so that elements of the holder are spaced apart with gaps between elements varying in a manner to receive and hold small objects of various different sizes. A like object is to make the small object holder adjustable in width and length to suit the user's requirements, and to make it securable against sliding or dropping to various supporting structures.

It is also an object to make a type of small object holder operating to hold small items against contact with each other or anything other than the relatively soft material of the holder, and spacers and confining walls of like material, whether or not the objects extend partially out of the holder and preferably are confined wholly within it.

The above objects are obtained by making the holder of flies and similar small items in the form having a base and a multiplicity of legs extending outwardly from the base and secured to it so that base and legs are an integral entity. Each leg has an unsupported upper end formed with a somewhat enlarged portion—a knob, bulb or swelling, and these are preferably located at about the same distance above the base member. For objects as small as trout flies adjacent knobs are spaced from one another so that they almost touch but do not actually contact one another, the gap having a width about equal to, and preferably slightly less than, the diameter of the wire used in the hook of the fly. The knobs preferably extend laterally in both directions beyond the lower portions of the legs, with the result that such lower portions are spaced considerably further apart than the knobs. The base and legs are elongated so that the legs and their knobs form a parallel array resembling in miniature a layer of edge-abutting iron rails as a railroad company might store them for later use.

With the construction described, the hook portion of a fly is pushed down between a pair of adjacent knobs and released, such operation requiring only the use of one hand holding the head or loop end of the fly between thumb and forefinger. The knobs are spread apart only to a very minor extent, and return to their original positions or so close thereto that the gaps on either side of the one in which the fly was inserted remain at least partially open. While the pair of knobs which grip the fly exert only a small force on the fly, such force is concentrated along a line or very small area at the adjacent extremities of the knobs, and is applied to a very small portion of the hook of the fly. This concentration of the force on a small area results in a relatively high pressure, or high unit loading, which is more than adequate to retain the fly against sliding along the length of the gap or falling out of it, even when the assembly is completely inverted. This is especially true when the holder is made of rubber or one of the less smooth plastics such as the vinyls, although almost any material may be used which permits a small lateral bending of the legs, apparently even including such smooth surfaced materials as Teflon and the softer metals.

The knobs on the upstanding legs may have a wide variety of contours, of which a simple circular shape is probably the most convenient. This shape is also the most economical when the holder is made by the only manufacturing process which is economically feasible at the present time, an extrusion process. In this technique a plastic mass is rammed through an extrusion die having the desired cross section of the finished article, heat usually being required on the ram side of the die and cooling on the other side. To keep the knobs from contacting and sticking during manufacture, it is desirable to initially form the holder with the under side of the base formed on a cylinder, so that it has a concave shape and the knobs are spaced further apart than they will be in the finished article, having a more or less flattened base. When using a newer material as to which the optimum size gap between adjacent knobs for a given thickness of an object to be retained is not known, the economical procedure is to make the die with the maximum feasible gap size and extrude a trial run of the holder. If this gap size proves to be too large, the holes in the die for forming the knobs can then be reamed out to decrease the size of the gap.

The holder may be made with any width, and may be cut off to any desired length. In use, it is not necessary to place the base and legs in any sort of container, although this may be done if desired. A simpler and preferred technique is to coat the bottom surface of the base of the object holder with a strong adhesive, preferably one of the thermosetting or thermoplastic resin adhesives which may be covered with a protective sheet of special paper prior to application. The adhesive does not begin to work or "set" until the protective paper is removed, so the fisherman can wait until he finds a convenient time to apply the holder. He then strips off the protective paper and applies the holder to a convenient area of his clothing (or a removable patch thereon) with the adhesive side of the holder contacting the cloth. Presently available adhesives for such purposes are so strong that it is virtually impossible to separate the holder from even such hard, smooth surfaces as polished marble or metal, e.g., various synthetic resin adhesives made by the 3M Company (Minnesota Manufacturing and Mining Company).

In other applications where the holder must not be permitted to shift, it may be fastened to a magnetic base or strip and placed on a convenient iron or steel surface.

Forms of the invention also described below have straightsided legs to receive same small objects of special shapes. Other modifications may have grooves in the legs, rather than knobs, to receive small objects which must be protected during shipment.

The present invention is illustrated in particular forms found suitable for use with various smaller objects, but it is not intended that the invention claimed below be limited thereby Such illustrations appear in the attached drawing wherein:

FIGURE 1 is a lateral cross section of a form of object holder employing circular knobs on the upstanding legs.

Figure 2:
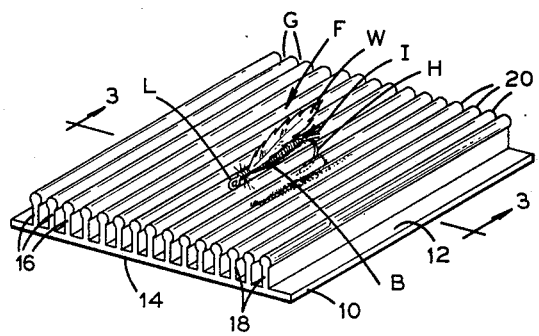
Figure 10:
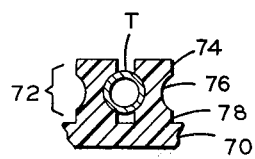
Figure 5:
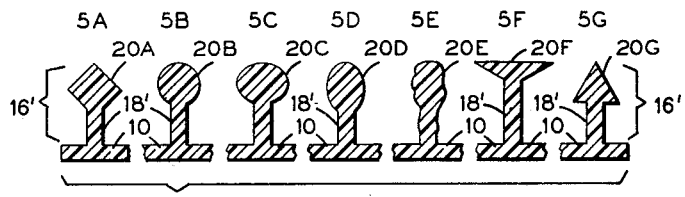
Figure 3:
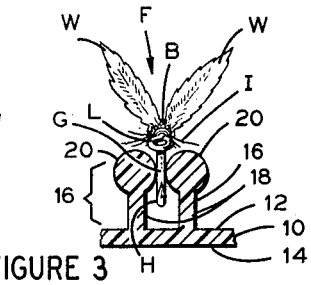
Figure 4:
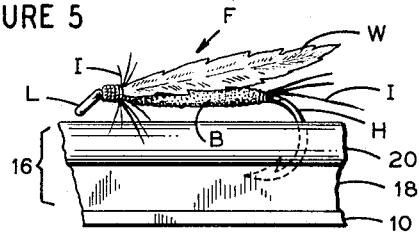
Figure 6:
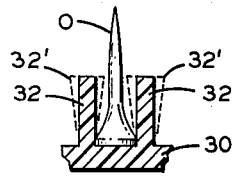
Figure 9:
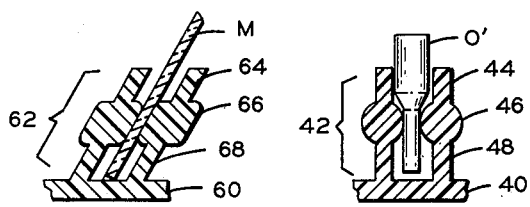
Figure 7:
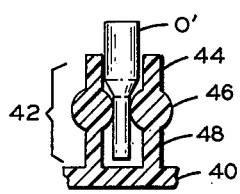
Figure 8:
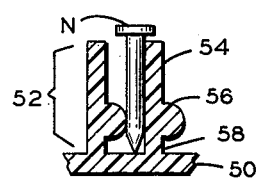

FIGURE 2 is an isometric view of the object holder of FIGURE 1 showing the holder containing a representative trout fly inserted therein as contemplated by the present inventor, FIGURE 3 is an enlarged fragmentary cross section of the object holder and received fly of FIGURE 2, as indicated by sectioning lines and arrows 3—3 therein, this view showing a typical disposition of the hook of the fly between a pair of knobs of the holder, FIGURE 4 is a fragmentary side view of the holder and fly of FIGURE 3, enlarged to the same scale, FIGURES 5A through 5G are a series of cross sections each of which shows a portion of a base of an object holder of the invention together with a single upstanding leg, the series showing a different knob or enlargement on the outer end of each leg, FIGURE 6 shows a modification of the invention having no knobs or swellings on the upstanding legs and adapted to receive objects having only tapering surfaces along their lengths, e.g., the illustrated golf tee, FIGURE 7 depicts a modification adapted to receive and support objects having two portions of different cross section, the holder having swollen portions or knobs below the top so that the leg portions above the knobs can furnish some lateral support for the objects being held, to prevent them from toppling, FIGURE 8 illustrates a modified embodiment wherein there are knobs lying below the outer ends of the legs, such knobs extend to only one side of the leg, and the outer ends may be utilized to support a headed object such as the illustrated nail, FIGURE 9 shows that the invention may be modified so that the legs are somewhat slanted with respect to the base, rather than normal thereto as in the other figures, this form being useful in situations such as an automobile dashboard counter surmounted by a rearwardly sloping windshield (and also somewhat more convenient for the user), and FIGURE 10 shows a modification of the invention adapted for use in shipping such small items as brittle tubes or rods.

The drawing includes only one figure showing a form of the invention suitable for use as a shipping container, but it is believed to be apparent that the embodiments shown may be readily adapted for use in shipping small articles which are easily damaged, e.g., fragile items made of glass or ceramics, metal parts with fine surface finishes, easily damaged threads or knobs, etc. Since in shipping containers ready removal of the small object is not so important as protection from collision, the construction using knobs may be utilized to keep the objects in place. In the FIGURE 1 form, for instance, an elongated glass object of rectangular cross section could be accommodated in the gap between the lower portions of the legs, and the knobs would keep the confined objects from moving upward. The FIGURE 6 form could be used for the same purpose, with an added cover made of the same material as the holder proper, the softness of both holder and cover being selected with due consideration for the relative brittleness of the objects to be shipped.

In such shipping containers, when the shipped objects are so short in length that a multiplicity of them can be accomodated between a single pair of legs, separators of short length can be inserted between the legs to keep the objects from touching one another, such separators being also made of soft material and being shaped to prevent their springing out of the holder. Where necessary to accommodate objects of intricate shape, the holders as heretofore described can be modified by cutting away portions of the legs to receive protuberances on the objects, and the interfit of the cutaway part of the legs with such protuberances may in itself serve as a means for spacing and separating the objects.

The fly holder of FIGURES 1–4 consists of a base 10 having an upper surface 12 and a lower surface 14. A multiplicity of legs 16 extend upwardly from upper surface 12 of the base and are rigidly secured to base 10, preferably being extruded therewith as previously mentioned. Each leg has a lower base portion 18 which is relatively thin and an upper swollen portion or knob 20 of circular cross section, the knob extending laterally to both sides of lower portion 18 in this embodiment. A multiplicity of legs 16 are uniformly spaced across the width of base 10 to accommodate a selection of trout flies not varying greatly in hook size and using hooks formed from wire not varying greatly in diameter from one hook size to another, and such legs extend in a parallel array along the length of base 10. In production, the width of the array may be quite large and hundreds or thousands of feet may be run at one time, after which the material is cut to widths and lengths more suitable for individual use, but the individual holders may nevertheless be quite large, so that the final dimensions may be determined by the desires of the individual fisherman. Of course, legs 16 can be varied in spacing, height and gap width between adjacent knobs, so that a wide range of hook sizes can be accommodated in a single holder, a large size between one pair of legs, a smaller size hook between another pair of legs, etc.

As can be seen from FIGURES 1–4, the gaps G between the closest approach of adjacent knobs 20 to each other are small but definite, being only slightly less than the wire diameter of the hook H or fly F. When such hook is inserted into the gap to contact the gap-defining knobs 20 and spread them slightly apart, there is only a very slight amount of interference, of the order of hundredths or thousandths of an inch, depending on the size of the hook (or other item to be inserted), but this small interference is nonetheless sufficient to retain the fly (or other item) against all ordinary movements of the holder in whatever position it may be placed, including ordinary impacts in inverted position. Naturally, the interference will vary with the nature of the material used to form the object holder. With some of the softer materials (which are nevertheless not so soft as to risk sinking of the barb of a hook therein) the gap G for all practical purposes may have to disappear to provide the needed interference, i.e., knobs 20 may actually touch at their extremities. The standard applied by the present inventor is to regulate such gap and interference so that the hooks will be properly held in one gap without appreciably affecting gaps between other pairs of legs of the holder.

An examination of FIGURES 1–4 will show that the bulk of the fly rests unruffled above or on the knobs 20, with wings W and hackles I undisturbed. This is possible because the closeness of gap G makes it difficult to push body B and loop or head L of the fly down through the gap. By comparison with the minimum dimension of gap G, lower portions 18 of legs 16 define a gap having a width several times greater than that of gap G.

FIGURES 5A through 5G merely show that, with a base 10 and lower portion 18' of leg 16' essentially the same as in the FIGURES 1–4 embodiment, a wide variety of knobs 20A through 20G may be employed. Knob 20A is diamond shaped, for instance, 20B is circular, 20C is elliptical with the longer axis parallel to base 10, while knob 20D is elliptical with the longer axis normal to the base. Knob 20E is irregular and knotty, 20F is flat-topped and slating inwardly on its lower surface, and 20G is the reverse of 20E, flat-bottom and tapered on top. Each of these can be used for various small objects of different shapes and to obtain various gap widths and unit loadings, those more suitable for trout flies probably excluding the last two mentioned. Of course, various combination of knobs 20A through 20G may be used in a single holder to receive and retain a variety of small objects having diverse shapes and dimensions.

It may here be mentioned that the possibility of hooking the fly into the material of the leg presents no real problem, as the material is not so soft that the hook can be readily inserted into the holder to the extent of sinking the barbs. A minor amount of contact of the point of hook H is added (but unnecessary) insurance that the fly will stay put, as the fisherman can readily disengage the point when he grasps the fly by the loop L. It may also be mentioned that the material used by the holder should be resistant to the oils customarily found in a fisherman's tackle box, and should not become brittle on prolonged exposure to sunlight. There are many rubbers, plastics and soft metals presently commercially available having all these characteristics.

In the FIGURE 6 modification the holder has legs 32 extending integrally from a base 30, but legs 32 have no knobs as in the previously described embodiments, to which they are otherwise similar. This knobless form of the invention is adapted to hold objects O with tapering sides not readily gripped by a pair of knobs, as by pushing the enlarged head of object O (a golf tee) down between legs 30, as illustrated. Legs 30 could also be modified so that they slant upwardly and inwardly toward each other, and while such a structure would be useful every other gap could not be used for objects such as O because the defining legs would slant in the wrong direction. However, this could be remedied by modifying the FIGURE 6 to have legs like 32', wider at the top than at the bottom and defining between each pair of adjacent legs a gap which is wider at the bottom than at the top. Note that this is quite similar to the form shown in FIGURE 5F.

In FIGURE 7 there is shown as modification wherein the object holder is like that in FIGURES 1–4, having a base 40 and upstanding legs 42, except that in this modification legs 42 have upper portions 44 of smaller thickness than knobs 46. In other words, knobs 46 are located intermediate the lower portions 48 and upper portions 44, the latter being added to help support a long object O', here shown as an object with a portion of greater thickness than a portion adapted to be gripped by knobs 46.

The FIGURE 7 embodiment could also be used to support headed objects such as bolts, screws and nails N as shown in FIGURE 8. The form of the invention shown in the latter figure has legs 52 upstanding from a base 50 which are also provided with upper portions 54 of lesser thickness than knobs 56, the overall height of legs 52 being selected for the support of elongated, narrow objects (overly long nails, etc., can also be tilted away from the observer). Knobs 56 are again disposed intermediate the upper portions 54 and lower portions 58, but knobs 56 of FIGURE 8 differ from knobs 46 of FIGURE 7 in extending to only one side of legs 52. This construction narrows the gap between the upper portions 54 to prevent the heads of nails N from entering such gaps, permitting the nails to be supported on the upper ends of legs 52, as illustrated. In general, it is undesirable, in an object holder applied to uses wherein the user desires ready removal of the objects, that any of the objects slip completely down between the legs. Some such objects would be damaged if this were to happen, such as the illustrated trout flies, and for any such objects it would be somewhat annoying to fish the object out from between adjacent legs.

FIGURE 9 simply illustrates that the object holder of the invention may be made with legs 62 extending slantwise from the base 60 to which they are secured. While shown with knobs 66 intermediate upper and lower portions 64 and 68 and supporting a wide object M of uniform thickness, such as a hand mirror, it is believed to be apparent that the legs 62 could be made slanted but could otherwise be made like any of the other embodiments described.

FIGURE 10 shows a form of the invention adapted for receiving a delicate part T of tube or rod configuration, as shown. The usual base 70 has a number of integral legs 72 projecting outwardly from one surface, and each leg has a cavity or groove 76 between upper and lower portions 74 and 78 adapted to cooperate with a registering groove in the adjacent leg to hold the rod or tube against movement. Tubes T could be quite small in length, being separated by short spaces of the same circular dimensions and made of the same relatively resilient material as the holder itself. Since upper portion 74 may be made so wide as to prevent upward movement of the small objects, they may be slid into the holder from either end, after which the ends may be capped with the same resilient material .

This undersigned inventor-applicant has provided an object holder for fishing flies and numerous other small objects which is susceptible of manufacture in many modifications and can be applied to many uses. Consisting essentially of a sheet-like base member having secured thereto a multiplicity of legs extending outwardly from a surface of the base, the basic structure may be varied as to leg spacing, use or nonuse of contouring of the legs with knobs or protuberances and grooves, shapes of any such knobs or grooves, the spacing of such contoured portions of the legs from the base, the lateral gaps between such contours, the presence or absence of leg portions above the contours, the angles made by legs or surfaces of legs with the base, and the lateral direction in which the contours extend relative to other leg portions, to hold small objects of all conceivable shapes and sizes. The objects may be held so that only a portion enters the space between the legs and a predetermined portion protrudes, as in a fly holder or a holder for such common shop items as nails and screws (and other small parts which must be rapidly and repetitively withdrawn from the holder, such as clips used in wiring, switches, valves, etc., in assembly line production of automobiles). It may also be modified to hold all of the small objects securely within the holder to prevent the objects from colliding with each other, thus converting the holder to a shipping container.

When used to hold flies, the holders may be secured to the fisherman's clothing, creel or other tackle, by the mentioned types of adhesives, thus making the flies readily available to the sight and touch. All flies are secured in the holder fully displayed, separated from each other, and without becoming entangled with one another. Any one fly may be selected and withdrawn, and later replaced, with no risk that the others will be dropped or carried off by a sudden wind. The material used may be sufficiently soft that it can be cut with a pocket knife, and thus adjusted in size to suit the taste of the individual fisherman. He may later use them side by side or end to increase his fly-carrying capacity. When worn on his shirt or trousers, the holder is instantly available for one hand usage, as there is no need to grasp anything but one fly at a time.

When used to hold other objects, either the adhesive or the magnetic technique may be used to secure the object holder to a support. A carpenter can make good use of the invention to have nails readily visible and available, in assorted sizes separated by putting different size nails between differently spaced pairs of legs, and using the same technique as the fisherman to secure the holder to his overalls. Where there is less tendency to sliding of the object holder and it is important not to mar the finish of a support, a somewhat weaker adhesive may be used, e.g., a pressure-sensitive adhesive.

What is claimed is:

1. A holder for fishing flies which include hooks, said holder comprising a substantially planar base member and a multiplicity of laterally flexible legs secured to and extending normally up from said base member, said legs being elongated in parallel array along one dimension of the base member and closely spaced apart along a transverse dimension, said legs being contoured so that a pair of adjacent legs cooperatively receive and frictionally engage a part of the hook of each fly partially inserted downwardly between said pair of legs with a portion of each hook disposed above the gap between such pair of legs, the transverse dimension of said gap varying between the base member and the upper ends of the legs so that each of the pair of legs makes essentially only point engagement with the hooks to restrain them from accidental movement.

2. The fly holder of claim 1 in which said contouring of some of the legs comprises a swollen portion or knob spaced above said base and extending in at least one lateral direction beyond said leg.

3. A holder for fishing flies comprising a generally flat base member and a multiplicity of laterally spaced legs extending straight up from said base, said legs being elongated along the length of the base and a number of them having a lower portion and an enlarged portion or knob of greater width than the lower portion and extending laterally beyond at least one side of it, each said knob being spaced above said base and acting together with the nearest portion of the adjacent leg to define a norrow gap sized to receive a narrow portion of a hook of a fishing fly inserted downwardly through said gap so that the knob and the adjacent leg cooperatively grip said narrow portion of the hook and prevent it from foreseeable movement other than deliberate movement by a user, said gap receiving the hook so that a portion thereof extends above said gap, and said lower portion of the leg making no contact with the portion of the hook extending below said narrow gap.

4. The fly holder of claim 3 in which said knobs on adjacent legs extend laterally in both directions beyond the lower portions of their respective legs and said knobs are disposed at the tops of said lower portions to define a very small or disappearing gap adapted to receive, engage and restrain the hook portion of a trout fly so that the body, wings and other parts of the fly are disposed above said knobs.

5. A holder for a fisherman's flies comprising a substantially flat base and a multiplicity of legs secured to and extending outwardly from a surface of said base to be generally perpendicular thereto, adjacent pairs of said legs receiving hooks of fishing flies partially inserted downwardly therebetween, each pair defining a transverse gap having a narrowest or neck portion spaced above said base, the parts of the pair of legs adjacent the neck portion acting cooperatively to receive and frictionally engage the hooks received in said gap but not contacting the other parts of the legs.

6. An extruded receptacle for fishing flies comprising a generally flat base member and a multiplicity of legs secured to and extending normally outwardly from said base member, said legs having swollen portions or knobs spaced above the base member, said legs being elongated parallel to one another along the length of the base and spaced from one another across the width of the base so that the knobs of adjacent legs define smaller gaps with each other than the gaps between the parts of the legs disposed below the knobs, whereby the hook portion of a fly may be inserted between a pair of adjacent knobs and into the gap between the lower portions of the legs with the shank and wings of the fly disposed above said pair of adjacent knobs, the portions of the gaps below said knobs being wider than the gaps at the knobs so that the fly touches only the knobs of adjacent legs and is frictionally engaged thereby, said gaps between the knobs varying down to the point of disappearing with decreasing wire diameter of the hook and greater softness of the material of said receptacle.

References Cited

UNITED STATES PATENTS

| | | | |
|---|---|---|---|
| 1,980,141 | 11/1934 | MacGregor | 206—43 |
| 2,161,855 | 6/1939 | Copell. | |
| 2,188,987 | 2/1940 | Strom | 43—57.5 |
| 2,228,493 | 1/1941 | Will | 120—23 |
| 2,280,003 | 4/1942 | Pearson. | |
| 2,553,097 | 5/1951 | Lampe. | |
| 2,736,428 | 2/1956 | Wenger | 206—72 |
| 2,861,682 | 11/1958 | Hatcher | 206—72 |

WARNER H. CAMP, Primary Examiner